(12) United States Patent
Morejon et al.

(10) Patent No.: US 6,996,189 B1
(45) Date of Patent: Feb. 7, 2006

(54) SYMMETRIC SPHERICAL QAM CONSTELLATION

(75) Inventors: Israel Morejon, St. Petersburg, FL (US); Jwalant Dholakia, St. Petersburg, FL (US); Yueping Zeng, St. Petersburg, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 43 days.

(21) Appl. No.: 10/064,570

(22) Filed: Jul. 26, 2002

(51) Int. Cl.
*H04L 27/36* (2006.01)

(52) U.S. Cl. .................. 375/261; 375/298; 332/103

(58) Field of Classification Search ........... 375/261, 375/298, 322; 332/103

See application file for complete search history.

(56) References Cited

U.S. PATENT DOCUMENTS

| | | |
|---|---|---|
| 6,614,861 B1 * | 9/2003 | Terry et al. .............. 375/347 |
| 2003/0076890 A1 * | 4/2003 | Hockwald et al. ........ 375/264 |

FOREIGN PATENT DOCUMENTS

| | | | |
|---|---|---|---|
| FR | 2606233 | * | 5/1988 |
| WO | WO01/86903 | * | 11/2001 |

* cited by examiner

*Primary Examiner*—Amanda T. Le
(74) *Attorney, Agent, or Firm*—Molly L. Sauter; Smith & Hopen, P.A

(57) ABSTRACT

A quadrature amplitude modulation implementation incorporating a symmetric spherical quadrature amplitude modulation constellation. The symmetric spherical quadrature amplitude constellation, as displayed in a multi-dimensional complex plane, is bounded by a surface comprising all symbol points at a predetermined distance from a center point and coincident with the intersection of at least two axes, and exhibiting correspondence in relative position of the symbol points on opposite sides of the at least two axes.

24 Claims, 10 Drawing Sheets

FIG. 6a

| QAM size | Square Constellation | | | | Circular Constellation | | | | Spherical Symmetric Constellation | | | |
|---|---|---|---|---|---|---|---|---|---|---|---|---|
| | Peak Power | Average Power | Average Power (dB) | PAR (dB) | Peak Power | Average Power | Average Power (dB) | PAR (dB) | Peak Power | Average Power | Average Power (dB) | PAR (dB) |
| 16 | 18 | 10 | 10 | 2.5527 | 14.9282 | 11.686 | 10.6804 | 1.0597 | 14.7005 | 9.7162 | 9.87496 | 1.7984 |
| 64 | 98 | 42 | 16.2325 | 3.6798 | 79.77 | 50.5932 | 17.0409 | 1.97747 | 78.3406 | 40.4231 | 16.0663 | 2.8736 |
| 256 | 450 | 170 | 22.3045 | 4.2276 | 365.0898 | 206.2193 | 23.1433 | 2.4807 | 312.9502 | 160.2957 | 22.0492 | 2.9055 |
| 1024 | 1922 | 682 | 28.3378 | 4.4997 | 1558.2479 | 828.7357 | 29.1842 | 2.74221 | 1265.1433 | 638.8297 | 28.0539 | 2.9675 |

Note: minimum distance d_min = 2

FIG. 6b

| QAM Constellation size | Peak Power Reduction (Sq./Sph) (dB) | Peak Power Reduction (Cir./Sph) (dB) | PAR Reduction (Sq./Sph) (dB) | PAR Reduction (Cir./Sph) (dB) |
|---|---|---|---|---|
| 16 | 0.879403987 | 0.066753385 | 0.754368445 | -0.7387 |
| 64 | 0.972391823 | 0.078526986 | 0.806195079 | -0.8961 |
| 256 | 1.577372803 | 0.669244662 | 1.322102313 | -0.4248 |
| 1024 | 1.816136635 | 0.904968304 | 1.532143876 | -0.2253 |

SYMMETRIC SPHERICAL QAM CONSTELLATION

BACKGROUND OF INVENTION

1. Field of Invention

The present invention relates to the field of digital communications. More specifically, the present invention provides for a novel quadrature amplitude modulation (QAM) constellation and method of implementation.

2. Background of Invention

The field of data communications typically uses a modem to convey information from one location to another. Modems communicate by modulating a signal carrying digital data, converting the modulated digital signal to an analog signal, and transmitting the analog signal over the transmission medium using various techniques known in the art. Various modulation schemes have been proposed that can effectively increase the information handling capacity of the communication channel. Quadrature amplitude modulation (QAM) has evolved as one of the most attractive schemes to modulate and transmit data over band-limited channels. QAM is a modulation method that is used to encode a variable number of bits into both a phase and amplitude modulated signal.

QAM is accomplished by adding amplitude modulated sine and cosine waves. These two components, 90° out of phase, are said to be in quadrature. By simultaneously modulating amplitude and phase, the signal can carry more bits for every symbol. One convenient way to represent the possible states is to use a constellation pattern diagram where amplitude is represented by the distance away from the intersection of an "I" and "Q" axis. Where "Q" represents the quadrature component of the symbol, and "I" represents the in-phase component. The phase is the angle measured counterclockwise from the 0° reference. By convention, the zero angle reference is normally the positive I axis. The resulting symbol is a complex sinusoidal with a magnitude, phase and frequency. A number of bits are mapped into the in-phase and quadrature components of a complex symbol, which is converted to analog form and then transmitted over a channel. A map of all the possible complex signal vectors is called the constellation of the QAM encoder.

Various QAM constellations are known in the art. When designing a constellation, consideration must be given to:

(1) The minimum Euclidean distance between neighboring symbol points in the constellation, this distance being representative of the noise immunity of the constellation scheme and hence a measure of the bit error rate (BER).

(2) The phase rotation within the constellation affecting the scheme's resilience against clock recovery imperfections and channel phase rotations.

(3) The peak-to-average power ratio, which effects the amplifier requirements of the constellation implementation.

(4) Simplicity of implementation and of detection.

An ideal data communication system requires that the transmission power level be as low as possible, the data rate of the transmission should be as high as possible, and the bit error rate should be as low as possible. In all communications systems, higher data rates and lower bit error rates are desirable. An improvement in any one or two of these three attributes can often lead to a decline in the remaining attributes(s), resulting in a less efficient communication system.

Band-limited channels exhibit limitations on data carrying capacity (bandwidth) due to bounded signal-to-noise ratio (SNR). Under these conditions, lower bit error rates (BER) are obtained by maintaining a greater minimum distance between symbol points of the constellation while at the same time keeping the average power required for the constellation to a minimum. Maintaining a high minimum distance between symbol points lowers the possibility of errors and therefore reduces the BER, however, separating the symbol points also increases the constellation's power level. QAM constellations known in the art attempt to unite the optimal Euclidean distance between symbol points with a given constellation size. For optimal constellations, i.e. those for which the minimum distances between each point and its nearest neighbor(s) are equal, the error rate in high signal-to-noise ratio conditions is mainly determined by the minimum distance.

In a coherent communication system, a receiver requires an absolute carrier reference to detect valid data. Noise and interference can disrupt the carrier reference resulting in phase rotation. When the receiver loses the phase reference, it must reacquire the absolute carrier phase before valid data can again be detected. A non-rotationally invariant communication system must undergo a rigorous absolute carrier phase reference acquisition and reacquisition process, often requiring tens of thousands of unit baud intervals to complete. As such, rotational invariance is advantageous to an efficient communication system.

Various methods are known in the art for establishing rotationally invariant constellations. It is known to establish fully rotationally invariant systems by inserting parity or pilot bits, by shifting the symbol points of a known constellation, and by differential data encoding. However, these known techniques are undesirably complicated, inefficient or applicable only to lower order modulations. By contrast, the present invention provides a rotationally invariant constellation resulting from the geometry of the constellation and associated placement of symbol points.

Various modulation techniques in use today have different associated peak-to-average power ratios. Multi-dimensional modulation schemes, such as QAM, construct the waveform to be transmitted from multiple pulse streams that are generated according to the received data. The pulse shape spans several symbol intervals to minimize the bandwidth of the transmitted waveform and ensure that the transmitted waveform does not interfere with other systems operating at adjacent frequencies. As a result of the required pulse shaping, one data symbol may overlap pulses associated with adjacent data symbols. Certain data sequences will cause these overlapping pulses to add constructively and produce large peaks in the envelope of the transmitted waveform, while other data sequences will result in a cancellation effect and produce small envelope values. This fluctuation in the signal envelope is quantified by the peak-to-average power ratio of the constellation.

Analog front-end amplifiers are used to boost the signal prior to transmission. These amplifiers perform best when the signal envelope remains in the linear region. Large peaks result in non-linear behavior of the amplifier. It is highly desirable to utilize a modulation scheme that exhibits a peak-to-average power ratio (PAR) as low as possible. A low PAR minimizes the demand placed upon the amplifier to handle peak powers that are significantly larger than the average power, allowing the amplifier to operate linearly and also reduce power consumption. Lower peak power and PAR level systems are particularly attractive in wireless communications because they allow the use of less expensive front-end amplifiers, achieve better spectral containment within an allocated frequency band and reduce power consumption.

Various modulation techniques are known in the art to reduce the PAR while still maintaining the data rate and symbol error rate required for high-speed, narrowband communication systems. U.S. Pat. No. 5,606,578 to O'Dea describes a modulation technique utilizing two constellations in an alternating manner to reduce the peak-to-average power ratio of the amplifier. U.S. Pat. No. 5,381,449 to Jasper describes a method by which PAR is reduced through the introduction of additional "pilot symbols" into the constellation. These modulation techniques, and others, have advanced the art and serve to reduce the PAR, however, the current techniques known in the art also result in an undesirable reduction in the data rate of the system and increased complexity.

Advancements are known in the art that describe a PAR reduction scheme via constellation shaping. However, it is observed that constellations generated by these known methods of constellation shaping are neither completely symmetric nor spherical.

There remains a need, therefore, for a QAM constellation appropriate for high data rates that consumes less power, maintains the same bit-error-rate performance, and is easy and cost effective to implement in hardware or software.

However, in view of the prior art considered as a whole at the time the present invention was made, it was not obvious to those of ordinary skill in the pertinent art how the identified need could be fulfilled.

SUMMARY OF INVENTION

The longstanding but heretofore unfulfilled need for a QAM constellation that exhibits desired modulation characteristics superior to constellations known in the art is now met by a new, useful, and nonobvious invention.

The present invention discloses a symmetric spherical QAM constellation. A novel quadrature amplitude modulation signal space implementation produces a symmetric spherical QAM constellation. When displayed in a multi-dimensional complex plane, the constellation is bounded by a surface comprising all symbol points at a predetermined given distance from the origin.

According to an embodiment of the invention, a two-dimensional symmetric spherical QAM constellation containing N symbol points is mapped in a two-dimensional complex plane identified by an in-phase and a quadrature axis. The number of N symbol points required for the constellation is determined by the number of bits, n, in a binary word, where $N=2^n$. The N symbol points exhibiting equal, optimized, minimum distances between each N symbol point and its nearest neighbor(s).

The location of the constellation symbol points in the complex plane are geometrically described by having an innermost amplitude ring with four equally spaced symbol points. Additionally, the QAM constellation comprises at least one shell having at least one amplitude ring. The number of amplitude rings within the shell is equivalent to the index of the shell within the constellation. As such, the 3rd shell of the constellation contains 3 amplitude rings. The total number of shells in the constellation is determined by the square root of N/4. The number of symbol points existing on a shell is determined by $4+8(n_{shell}-1)$, where $n_{shell}$ is the shell index. Four diameters of the constellation passing through the origin further define the geometry. A first two of these four diameters intersecting at substantially 90°, and a second two of these four diameters intersecting at substantially 90. The first two diameters being rotated relative to the second two diameters at substantially 45°. The number of symbol points existing on an amplitude ring is determined to be 4 if the symbol points of the amplitude ring exist on one of the four diameters of the constellation, and is determined to be 8 if the symbol points of the amplitude ring do not exist on one of the four diameters. Due to the geometry of the symmetric spherical constellation, the N symbol points exhibit eighth fold symmetry with point group type 4 mm.

In one aspect of the invention, the constellation is revealed in a two-dimensional complex plane where "I" denotes the in-phase axis and "Q" denotes the quadrature axis. By convention, the zero angle reference is normally the positive I axis.

The symmetric spherical QAM constellation as taught by the present invention can be implemented for bit streams where the number of bits per word is an integer and for bit streams where the number of bits per word is a non-integer value.

Due to the geometry of the symmetric spherical constellation, the constellations exhibit rotational invariance (RI) for any multiple of 90° and eighth-fold symmetry. As a result, a method of generating the symmetric spherical QAM constellation requires that only one eighth of the symbol points be calculated and stored, the remaining symbol points being generated by swapping of the quadrature and in-phase component values and sign-change operations such that, (Ij, Qj) represents a symbol point, j, with a phase component of $0°<\theta<45°$ (Qj, Ij) represents a symbol point, j, with a phase component of $45°<\theta<90°$ (−Qj, Ij) represents a symbol point, j, with a phase component of $90°<\theta<135°$ (−Ij, Qj) represents a symbol point, j, with a phase component of $135°<\theta<180°$ (−Ij, −Qj) represents a symbol point, j, with a phase component of $180°<\theta<225°$ (−Qj, −Ij) represents a symbol point, j, with a phase component of $225°<\theta<270°$ (Qj, −Ij) represents a symbol point, j, with a phase component of $270°<\theta<315°$.

(Ij, −Qj) represents a symbol point, j, with a phase component of $315°<\theta<360°$ A method of implementing the symmetric spherical QAM constellation into a modulation system involves receiving a binary data stream of n bits at a rate of 1/T and segmenting the binary data stream to produce $2^n$ binary words comprising n data bits per word, where n is an integer. The symmetric spherical QAM constellation is generated as previously described and the binary words are mapped to the constellation symbol points.

In an additional embodiment, the symmetric spherical QAM constellation can be implemented when the number of bits per symbol is a non-integer. It is known in the art to send n+1/2 bits per symbol utilizing a QAM constellation. According to this method, incoming bits are grouped into blocks of 2n+1 bits to transmit two $2^{n+1/2}$ symbols. Symbol points are drawn from both a $2^n$ constellation and a $2^{n-1}$ constellation. The additional bit determines the size of the constellation to be used. As such, this known method can be incorporated into the present invention to allow the transmission of n number of bits per symbol when n is a non-integer.

In yet another embodiment of the invention, the binary data can be encoded prior to being segmented. Encoding techniques are known in the art, including forward error correction (FEC), block coding, convolution coding, Trellis coding, and various other methods developed to reduce the bit-error-rate (BER) and thus improve performance.

In a preferred embodiment, the quadrature amplitude modulation encoder receives a binary data stream. The binary data stream is encoded to reduce the bit-error-rate. The encoded binary data stream is segmented to produce $N=2^n$ binary words comprising n data bits per word. Amplitude and phase components are generated for N/8 symbol points, where the phase component is between 0° and 45°. Amplitude and phase components for the remaining (N−N/8) symbol points are generated by a combination of swapping and sign-change operations.

The constellation further comprises at least one shell with $n_{shell}$ amplitude rings where $N_{shell}=\sqrt{(N/4)}$ and $n_{pt,shell}=4+8(n_{shell}-1)$, where $N_{shell}$ represents the total number of shells in the constellation, N represents the total number of symbols in the constellation, $n_{pt,shell}$ represents the number of symbols on the shell identified by the shell index. Four diameters of the constellation passing through the origin further define the geometry. A first two of these four diameters intersect at substantially 90°, and a second two of these four diameters intersect at substantially 90°. The first two diameters are rotated relative to the second two diameters at substantially 45°. The number of symbol points existing on an amplitude ring is determined to be 4 if the symbol points of the amplitude ring exist on one of the four diameters of the constellation, and is determined to be 8 if the symbol points of the amplitude ring do not exist on one of the four diameters. All symbol points in the constellation are equidistant, and the symbol points demonstrate eighth fold symmetry with point group type 4 mm. The binary words are mapped to the symmetric spherical quadrature amplitude modulation constellation symbol points and the symbol points are transmitted over a transmission medium.

A specific objective of the invention is to provide a novel QAM constellation that exhibits superior desired characteristics over the prior art constellations.

It is a primary objective of the invention to provide a novel QAM constellation which continues to exhibit near-optimum margins against both Gaussian noise and phase shifting as additional symbol points are added.

It is another objective of the present invention to provide a QAM constellation that yields lower peak and average power than the conventional square and circular constellations.

It is still another objective of the present invention to provide a QAM constellation that reduces PAR compared to the traditional square constellation.

It is yet another objective of the present invention to provide a QAM constellation that meets the minimum distance criterion and thereby maintains the same bit-error-ratio (BER) as the square and circular constellations.

Still another objective of the present invention is to provide a QAM constellation for symbol points that can be mapped to both integer and non-integer numbers of bits.

Another specific objective of the present invention is to provide a QAM constellation that exhibits symmetric features that make it easy to implement in hardware and/or software.

The invention accordingly comprises the features of construction, combination of elements, and arrangement of parts that will be exemplified in the description set forth hereinafter and the scope of the invention will be indicated in the claims.

Other aspects and advantages of the present invention can be seen upon review of the figures, the detailed description, and the claims, which follow.

BRIEF DESCRIPTION OF DRAWINGS

For a fuller understanding of the nature and objects of the invention, reference should be made to the following detailed description, taken in connection with the accompanying drawings, in which:

FIGS. 6a and b are tables of calculation results corresponding to FIG. 1 to FIG. 5.

DETAILED DESCRIPTION

Figure 1:
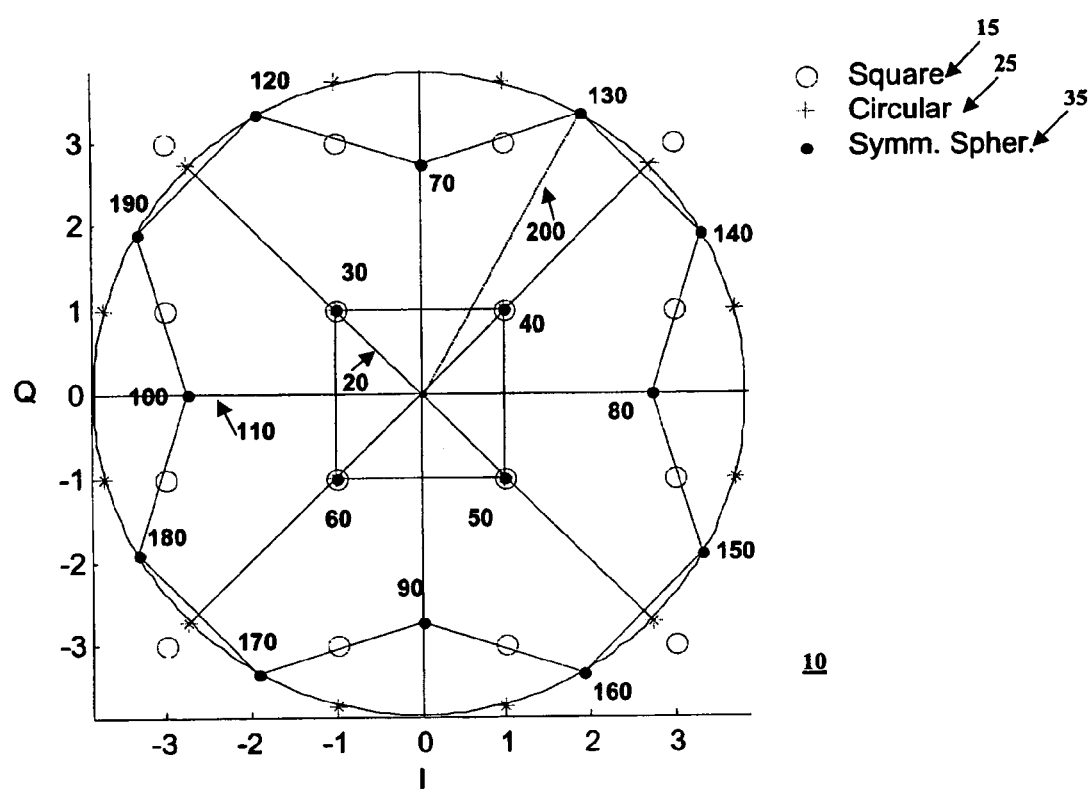
FIG. 1 is a comparison of the 16 QAM symmetric spherical constellation against the square and circular constellations.

Referring initially to FIG. 1, a symmetric spherical QAM according to the present invention is described. The QAM signal space 10 is shown displaying the prior art square constellation 15, the prior art circular constellation 25 and the symmetric spherical constellation 35 of the present invention. As exemplified in the diagram, the symmetric spherical constellation consists of an innermost amplitude ring having four equally spaced symbol points, 30, 40, 50 and 60, all located at an equal distance 20 from the intersection of the I and Q axis. This amplitude ring is considered the first shell of the constellation. The second shell of the constellation comprises the next two amplitude rings.

Figure 3:
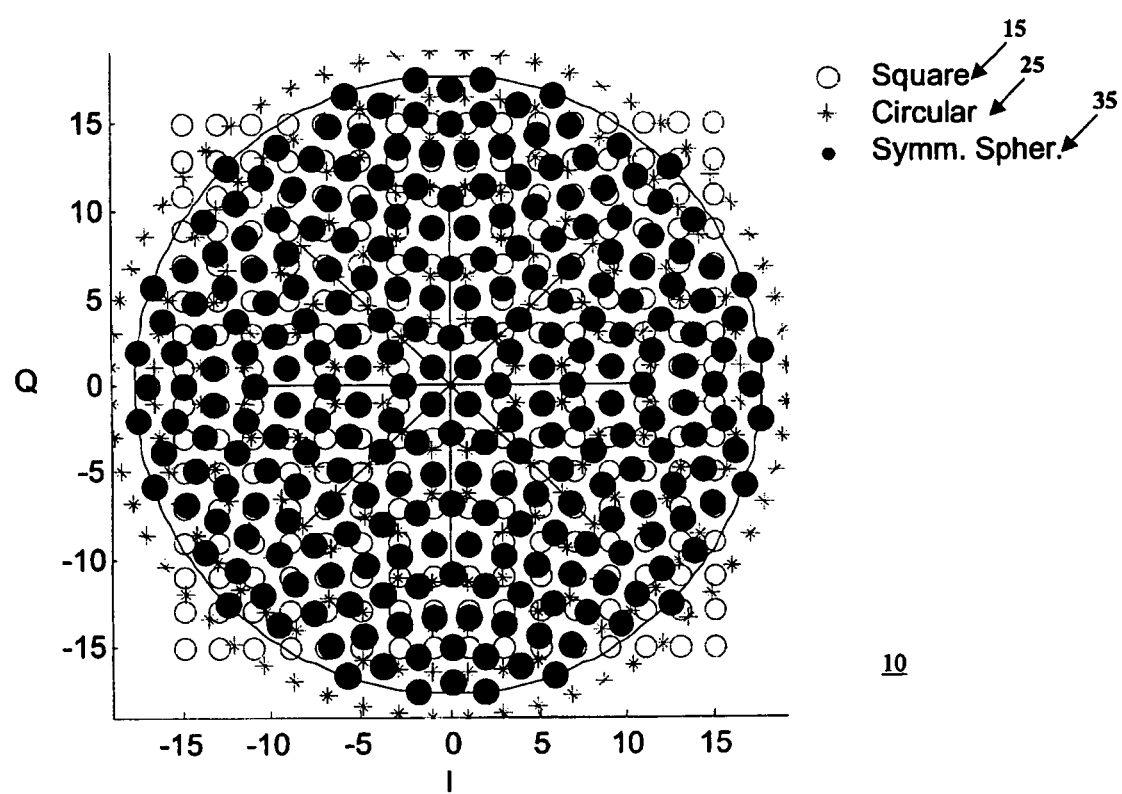
FIG. 3 is a comparison of the 256 QAM symmetric spherical constellation against the square and circular constellations.
Figure 4:
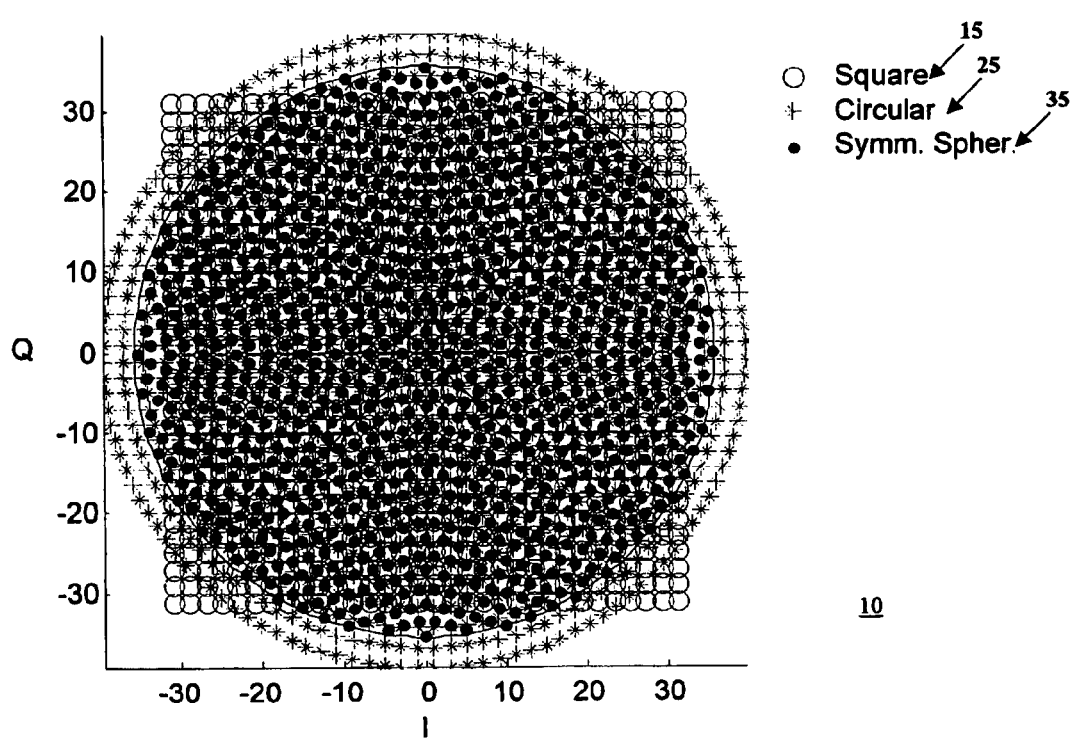
FIG. 4 is a comparison of the 1024 QAM symmetric spherical constellation against the square and circular constellations.

The first amplitude ring of the second shell comprises four equally spaced symbol points, 70, 80, 90 and 100, all located at an equal distance 110 from the intersection of the I and Q axis and shifted by 45 degree in contrast with the innermost symbol points. The second amplitude ring of the second shell comprises eight points, 120, 130, 140, 150, 160, 170, 180 and 190, all located at an equal distance 200 from the intersection of the I and Q axis. The symbols comprising the symmetric spherical constellation are also optimized in terms of Euclidean distance between adjacent symbols. The same approach outlined above is used to design higher order and dimension QAM constellations such as those shown in FIG. 2, FIG. 3 and FIG. 4. For higher order constellations the outermost shell is optimized according to the requirements described above.

The symbol points for the 16 QAM square 15 and 16 QAM circular 25 constellations are also identified in FIG. 1. For comparison purposes, the minimum Euclidean distance between the QAM symbols is assumed to be equal to 2. The outermost points of the square 15 and circular 25 constellations are farther away from the origin than the outermost points of the symmetric spherical constellation 35. As such, the constellation of the present invention 35 has lower peak power and PAR than the square 15 and lower peak power than circular 25 constellations. Reducing the peak power and the PAR of the constellation reduces the power consumption of the system and makes the constellation more desirable for mobile and other power-constraint communication systems.

Figure 5:
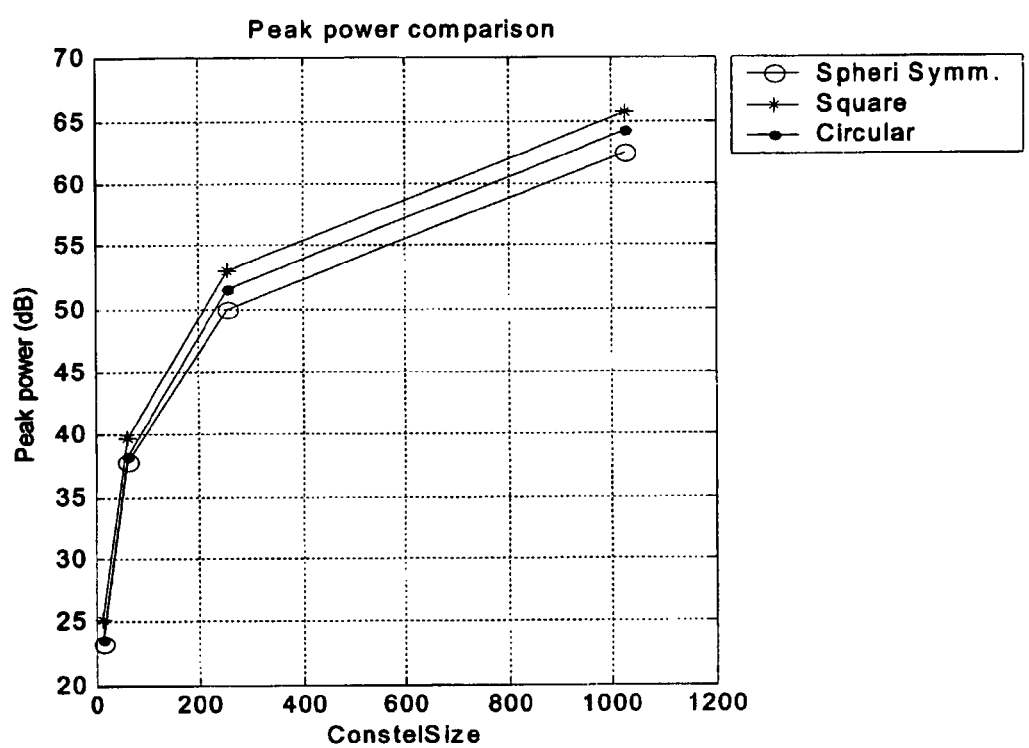
FIG. 5 is a graph comparing the peak power of the symmetric spherical constellation against that of the square and circular constellations at various constellation sizes.

FIG. 5 shows the peak power vs. constellation size for the symmetric spherical constellation 220, the prior art square constellation 230 and the prior art circular constellation 240. It can be seen from FIG. 5 that as the size of the signal space increases, the improvement in reduced peak power for the novel constellation becomes more significant. Corresponding theoretical calculations with a Euclidean minimum distance of 2 are shown in FIG. 6a and FIG. 6b. FIG. 6a details a comparison of peak power, average power and PAR for the prior art square, prior art circular and symmetric spherical constellation of the present invention at QAM sizes of 16, 64, 256 and 1024. FIG. 6b further compares the constellation by identifying the corresponding reduction in peak power and PAR at the various constellation sizes. The figures further emphasize the reduction in PAR provided by the symmetric spherical constellation of the present invention. The QAM constellation sizes represented in the figures are not meant to be limiting. Any other constellation sizes, including those where the number of bits to be mapped to a symbol point is non-integer, are within the scope of the invention.

It can be shown that the shells of the symmetric spherical constellation can be mapped to the corresponding square shells and thereby allow any coding techniques used for the traditional square QAM to be adapted to used with the constellation of the invention.

Figure 2:
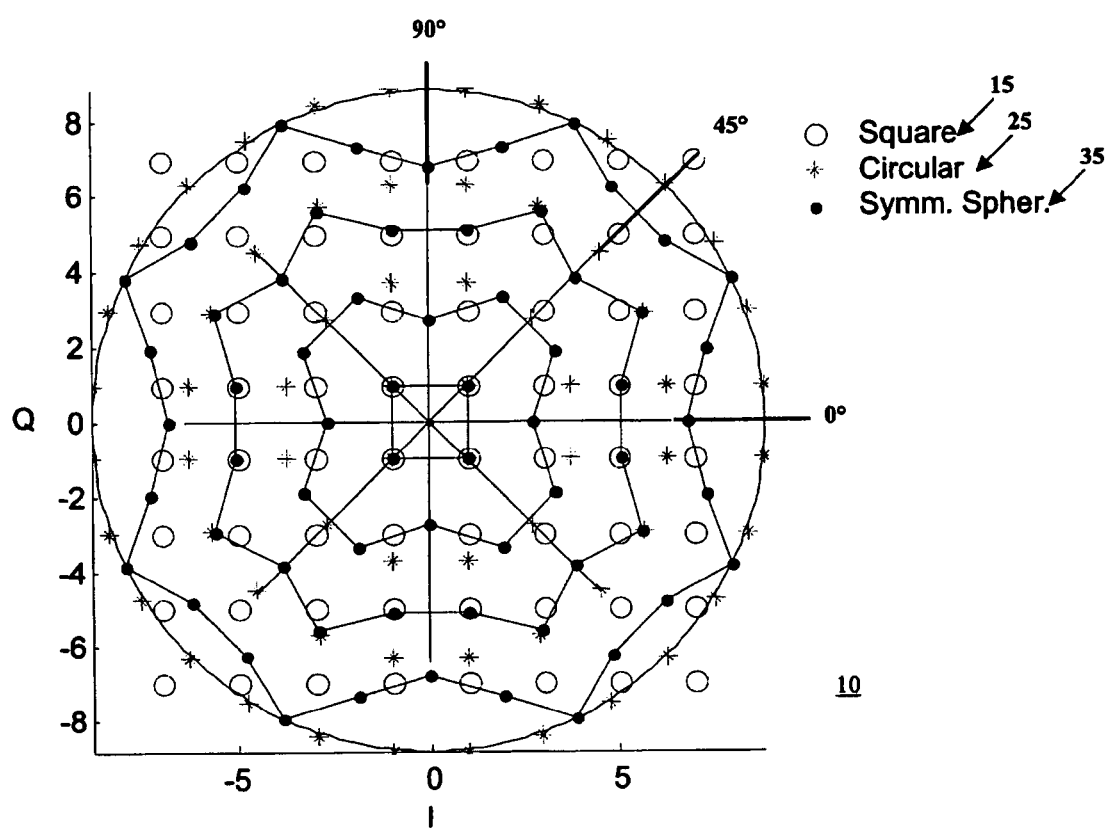
FIG. 2 is a comparison of the 64 QAM symmetric spherical constellation against the square and circular constellations.
Figure 7:
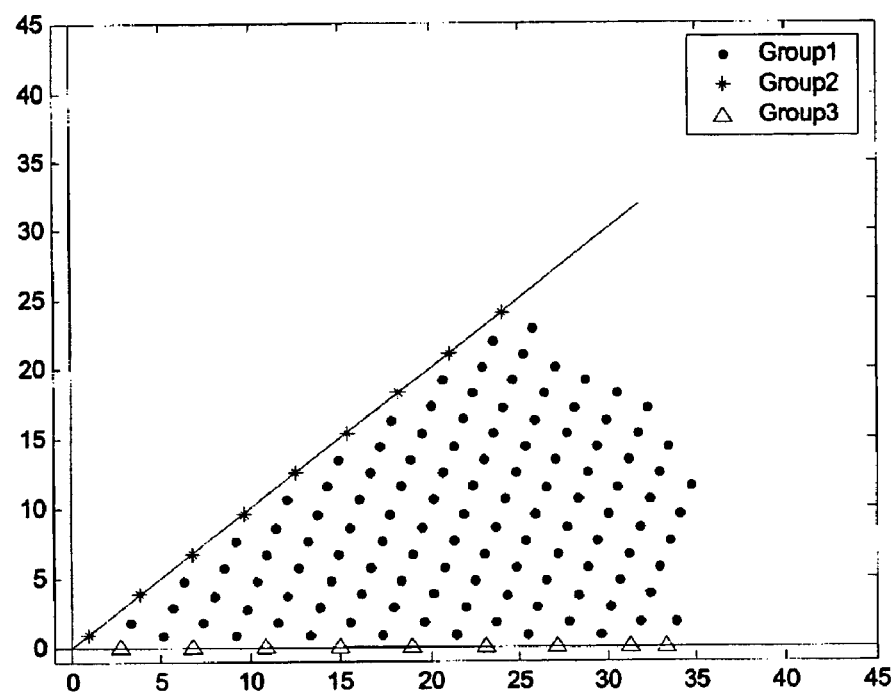
FIG. 7 is a graph identifying the general and special points of group type 4 mm for the 1024 QAM symmetric spherical constellation.

It can be seen from FIG. 2, that the symmetric spherical constellation of the present invention exhibits eighth-fold symmetry with point group type 4 mm. This geometric property of the constellation creates rotational invariance within the constellation for any multiple of 90°. Rotational invariance is a desirable feature of QAM constellations, providing immunity to phase ambiguities for multiples of 90°. Additionally, with symmetric operations of point group type 4 mm, a full set of symbol points can be derived from the generation of the symbol points with phase values between 0° and 45°. As can be seen in FIG. 2, the quadrature values for the symbol points between 0° and 45° are duplicated between 45° and 90° by swapping the I and Q component values. As such, it is only necessary to generate and store one-eighth of the total number of symbol points. The remaining symbol points in the signal set are generated through straightforward sign-change and swapping operations. FIG. 7 shows the symbol points that would need to be generated for the 1024 QAM symmetric spherical constellation. Group 2 and Group 3 are the points shared between adjacent 45° sectors of the constellation.

Figure 8:
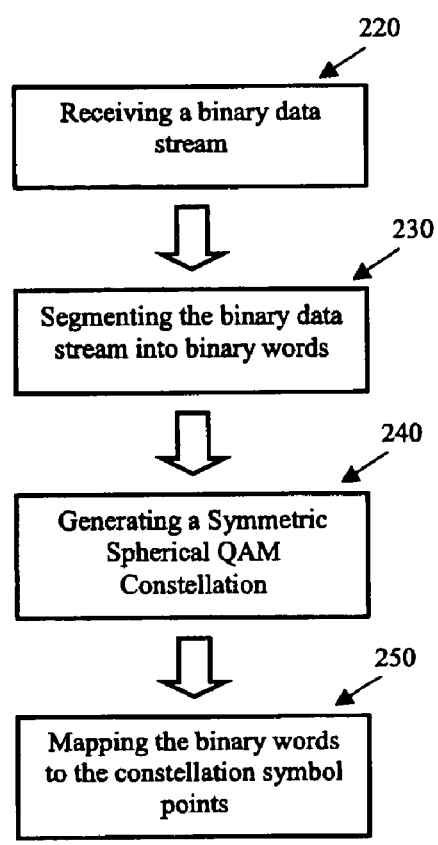
FIG. 8 is a block diagram of a method of employing quadrature amplitude modulation.

Now referring to FIG. 8, the data transmitted over a communication channel is typically in the form of a binary data stream. The binary data stream to be modulated is received by the modulation system 225. The uncoded binary data stream is first segmented into a group of n bits to form a binary word 235. The symbol points are identified by the QAM constellation 240. The binary word, comprised of n bits, is then mapped into one of the 2n symbol points by the QAM encoder 250. Each symbol point represents a unique combination of amplitude and phase values of the signal vector. The symbol point is then processed and transmitted over the transmission medium.

Prior to mapping, the transmitter may incorporate a forward error correction (FEC) technique to include, block coding, convolutional coding, Trellis coding or one of a variety of other coding techniques aimed at reducing the bit-error-rate (BER) and thus improving the system performance.

Figure 9:
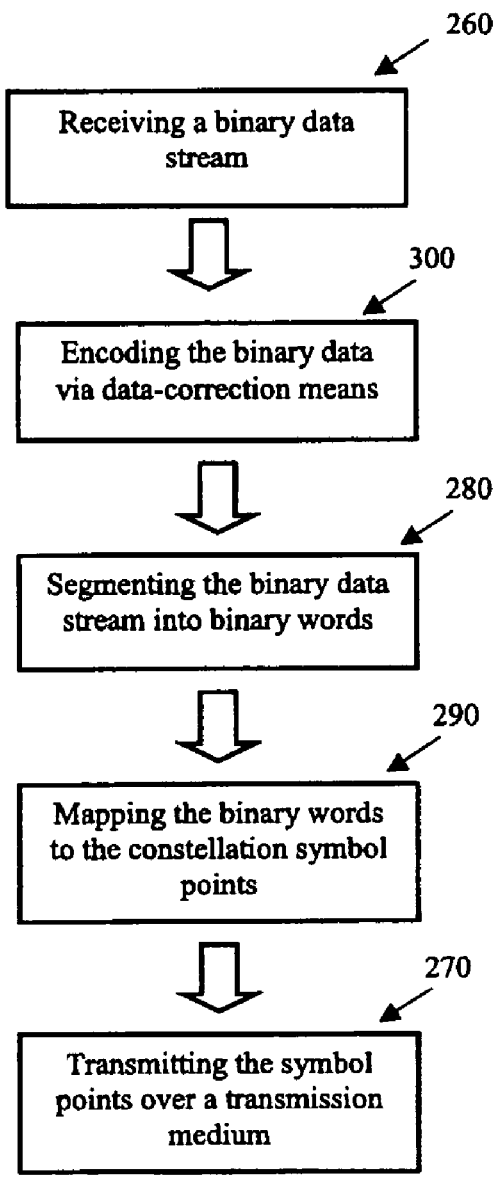
FIG. 9 is a block diagram of a method of employing quadrature amplitude modulation including encoding.

Now referring to FIG. 9, a binary data stream to be modulated is received by the modulation system 260. The binary data stream is coded according to a known technique 300. The coded binary data stream is first segmented into a group of n bits to form a binary word 280. The symbol points are identified by the QAM constellation 290. The binary word, comprised of n bits, is then mapped into one of the 2n symbol points by the QAM encoder 290. Each symbol point represents a unique combination of amplitude and phase values of the signal vector. The symbol point is then processed and transmitted over the transmission medium 270.

Figure 10:
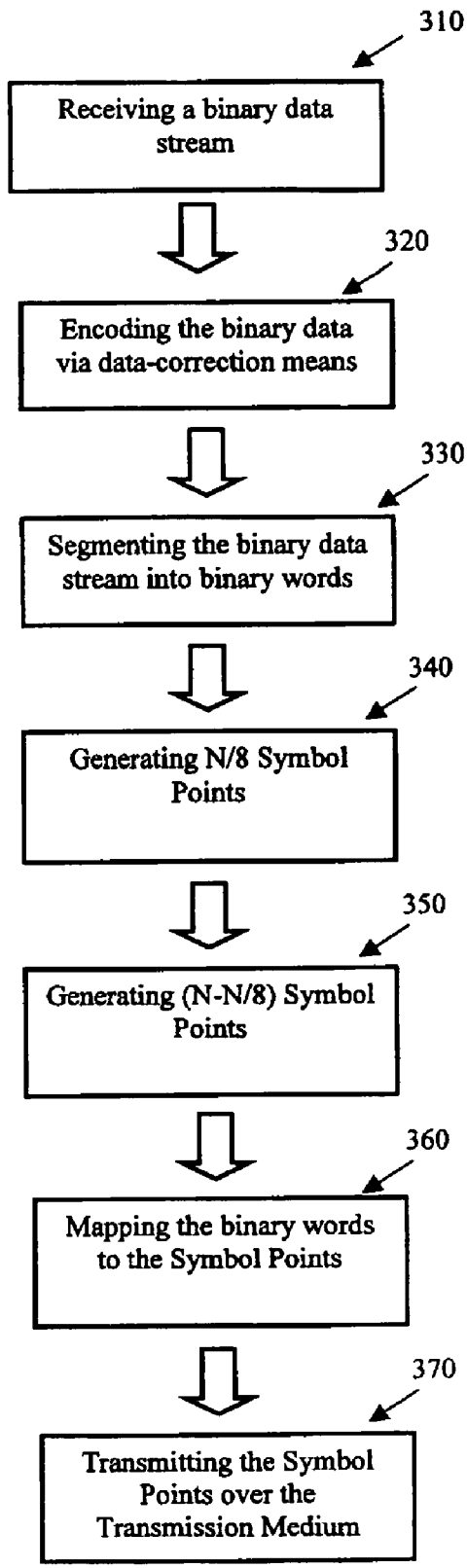
FIG. 10 is a block diagram of a preferred quadrature amplitude modulation method.

In a preferred embodiment of the present invention, as illustrated in FIG. 10, data to be transmitted over a communication channel is typically in the form of a binary data stream. The binary data stream to be modulated is received by the modulation system 310. The binary data stream is coded according to a known technique to improve the performance 320. The coded binary data stream is first segmented into a group of n bits to form a binary word 330. The N/8 symbol points are generated wherein the phase component of the symbol point is between 0° and 45° 340. The remaining (N–N/8) symbol points are generating by swapping of quadrature and in-phase component values and sign-change operations 350. The binary word, comprised of n bits, is then mapped into one of the 2 symbol points of the symmetric spherical quadrature amplitude modulation constellation by the encoder 360. The symbol point is then processed and transmitted over the transmission medium 370.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A modulator for mapping a binary stream of bits onto a modulation constellation, the modulator comprising:

a symmetric spherical quadrature amplitude modulation constellation in a multi-dimensional complex plane, the constellation bounded by a surface further comprising all symbol points at a predetermined distance from a center point, coincident with an intersection of at least two axes, and corresponding in relative position to the symbol points on opposite sides of the axes, wherein the symmetric spherical quadrature amplitude modulation constellation further comprises an innermost amplitude ring having four equally spaced symbol points and at least one shell comprising a plurality of symbol points exhibiting eighth fold symmetry with point group type 4 mm; and a mapper for mapping the binary stream of bits onto the symmetric spherical quadrature amplitude modulation constellation.

2. The modulator of claim 1, wherein the symmetric spherical quadrature amplitude modulation constellation further comprises:

N symbol points mapped in a two-dimensional complex plane identified by an in-phase and a quadrature axis, where $N=2^n$ and n represents the number of bits in a binary word;

equidistant spacing between each N symbol point and its adjacent neighbor(s);

at least one shell comprising $n_{shell}$ amplitude rings where, $$N_{shell} = \overline{\sqrt[c]{N/4}} \text{ and } n_{pt,shell} = 4 + 8(n_{shell} - 1)$$

where $N_{shell}$ represents the total number of shells in the constellation, N represents the total number of symbols in the constellation, $n_{pt,shell}$ represents the number of symbols on the at least one shell identified by the shell index, $n_{shell}$;

four diameters, passing through the origin, a first two of the four diameters intersecting at substantially 90°, and a second two of the four diameters intersecting at substantially 90°, the first two diameters rotated relative to the second two diameters at substantially 45°;

$n_{shell}$ amplitude rings comprising 4 symbol points when the symbol points exist on the diameters;

$n_{shell}$ amplitude rings comprising 8 symbol points when the symbol points exist off the diameter;

the N symbol points exhibiting eighth fold symmetry with point group type 4 mm.

3. The modulator of claim 2 wherein an "I" denotes the in-phase axis and a "Q" denotes the quadrature axis.

4. The modulator of claim 2, where n is an integer.

5. The modulator of claim 2, where n is a non-integer.

6. The modulator of claim 2, wherein the N symbol points further comprises:

an amplitude and a phase component for N/8 symbol points wherein the phase component of the symbol point, as identified by the location of the symbol point relative to the in-phase axis, is between 0° and 45°;

the amplitude and the phase component for the remaining (N−N/8) symbol points are such that, (Ij, Qj) represents a symbol point, j, with a phase component of $0° \leq \theta \leq 45°$ (Qj, Ij) represents a symbol point, j, with a phase component of $45° < \theta \leq 90°$ (−Qj, Ij) represents a symbol point, j, with a phase component of $90° < \theta \leq 135°$ (−Ij, Qj) represents a symbol point, j, with a phase component of $135° < \theta \leq 180°$ (−Ij, −Qj) represents a symbol point, j, with a phase component of $180° < \theta \leq 225°$ (−Qj, −Ij) represents a symbol point, j, with a phase component of $225° < \theta \leq 270°$ (Qj, −Ij) represents a symbol point, j, with a phase component of $270° < \theta \leq 315°$ (Ij, −Qj) represents a symbol point, j, with a phase component of $315° < \theta < 360°$.

7. A quadrature amplitude modulation method comprising:

receiving a binary data stream of n bits at a rate of 1/T;

segmenting the binary data stream to produce $2^n$ binary words comprising n data bits per binary word, where n is an integer;

mapping the binary words to a symmetric spherical quadrature amplitude modulation constellation symbol points, the symmetric spherical quadrature amplitude modulation constellation further comprising an innermost amplitude ring having four equally spaced symbol points and at least one shell comprising a plurality of symbol points exhibiting eighth fold symmetry with point group type 4 mm; and transmitting the symbol points over a transmission medium.

8. The method of claim 7, further comprising the step of encoding the binary data by error-correction means prior to segmenting the binary data stream.

9. The quadrature amplitude modulation method of claim 7, wherein the step of mapping the binary words to a symmetric spherical quadrature amplitude modulation constellation symbol points, further comprises:

mapping the binary words to a constellation comprising a first shell having an amplitude ring further comprising a plurality of symbol points equidistant from the center point, and a second shell having at least one amplitude ring, the at least one amplitude ring comprising a plurality of symbol points equidistant from the center point and rotated 45° relative to the amplitude ring of the first shell.

10. A quadrature amplitude modulation method, comprising the steps of:

receiving a binary data stream of n bits at a rate of 1/T;

encoding the binary data by error-correction means;

segmenting the encoded binary data stream to produce $2^n$ binary words comprising n data bits per word;

generating $2^n/8$ symbol points wherein the phase component of the symbol point is between 0° and 45°;

generating the remaining $(2^n - 2^n/8)$ symbol points by swapping of quadrature and in-phase component values and sign-change operations such that, (Ij, Qj) represents a symbol point, j, with a phase component of $0° \leq \theta \leq 45°$ (Qj, Ij) represents a symbol point, j, with a phase component of $45° < \theta \leq 90°$ (−Qj, Ij) represents a symbol point, j, with a phase component of $90° < \theta \leq 135°$ (−Ij, Qj) represents a symbol point, j, with a phase component of $135° < \theta \leq 180°$ (−Ij, −Qj) represents a symbol point, j, with a phase component of $180° < \theta \leq 225°$ (−Qj, −Ij) represents a symbol point, j, with a phase component of $225° < \theta \leq 270°$ (Qj, −Ij) represents a symbol point, j, with a phase component of $270° < \theta \leq 315°$ (Ij, −Qj) represents a symbol point, j, with a phase component of $315° < \theta < 360°$ mapping the symbol points in a symmetric spherical quadrature amplitude modulation constellation in a two-dimensional complex plane identified by an in-phase and a quadrature axis, comprising an innermost ring having four equally spaced symbol points, further comprising at least one shell comprising $n_{shell}$ amplitude rings where $N_{shell} = \overline{\sqrt[c]{N/4}}$ and $n_{pt,shell} = 4 + 8(n_{shell} - 1)$, where $N_{shell}$ represents the total number of shells in the constellation, N represents the total number of symbols in the constellation, $n_{pt,shell}$ represents the number of symbols on the at least one shell identified by the shell index, $n_{shell}$, further comprising, four diameters, passing through the origin, a first two of the four diameters intersecting at substantially 90°, and a second two of the four diameters intersecting at substantially 90°, the first two diameters rotated relative to the second two diameters at substantially 45°, where $n_{shell}$ amplitude rings comprise 4 symbol points when the symbol points exist on the diameters and $n_{shell}$ amplitude rings comprise 8 symbol points when the symbol points exist off the diameter, the symbol points having equidistant spacing between symbol points and its adjacent neighbor(s) and the symbol points exhibiting eighth fold symmetry with point group type 4 mm;

mapping the binary words to the symmetric spherical quadrature amplitude modulation constellation symbol points;

transmitting the symbol points over a transmission medium.

11. A modulator for mapping a binary data stream of bits onto a modulation constellation, the modulator comprising:

a symmetric spherical quadrature amplitude modulation constellation in a multi-dimensional complex plane, the symmetric spherical quadrature amplitude modulation constellation further comprising, a first shell having an amplitude ring comprising a plurality of symbol points equidistant from the center point, and a second shell having at least one amplitude ring, wherein the at least one amplitude ring comprises a plurality of symbol points equidistant from the center point and rotated 45° relative to the amplitude ring of the first shell; and a mapper for mapping the binary data stream onto the symmetric spherical quadrature amplitude modulation constellation.

12. The modulator of claim 11, wherein the at least one amplitude ring of the second shell comprises four symbol points equidistant from the center point.

13. The modulator of claim 11, wherein the second shell comprises symbol points arranged to exhibit eight fold symmetry with point group type 4 mm.

14. A modulator for mapping a binary data stream of bits onto a modulation constellation, the modulator comprising:

a symmetric spherical quadrature amplitude modulation constellation in a multi-dimensional complex plane, the constellation further comprising, N symbol points mapped in a two-dimensional complex plane identified by an in-phase and a quadrature axis, where $N=2^n$ and n represents the number of bits in a binary word, the constellation further comprising an innermost amplitude ring having four equally spaced symbol points and at least one shell comprising a plurality of symbol points exhibiting eighth fold symmetry with point group type 4 mm; and a mapper for mapping the binary data stream onto the symmetric spherical quadrature amplitude modulation constellation.

15. The modulator of claim 14, wherein the symmetric spherical quadrature amplitude modulation constellation further comprises:

equidistant spacing between each N symbol point and its adjacent neighbor(s).

16. The modulator of claim 14, wherein the symmetric spherical quadrature amplitude modulation constellation further comprises:

at least one shell comprising $n_{shell}$ amplitude rings where, $$N_{shell} = \overline{N/4} \text{ and } n_{pt,shell} = 4+8(n_{shell}-1)$$

where $N_{shell}$ represents the total number of shells in the constellation, N represents the total number of symbols in the constellation, $n_{pt,shell}$ represents the number of symbols on the at least one shell identified by the shell index, $n_{shell}$.

17. The modulator of claim 14, wherein the symmetric spherical quadrature amplitude modulation constellation further comprises: four diameters, passing through the origin, a first two of the four diameters intersecting at substantially 90°, and a second two of the four diameters intersecting at substantially 90°, the first two diameters rotated relative to the second two diameters at substantially 45°.

18. The modulator of claim 17, wherein the symmetric spherical quadrature amplitude modulation constellation further comprises:

$n_{shell}$ amplitude rings comprising 4 symbol points when the symbol points exist on the diameters; and $n_{shell}$ amplitude rings comprising 8 symbol points when the symbol points exist off the diameter.

19. The modulator of claim 14, wherein the N symbol points exhibit eighth fold symmetry with point group type 4 mm.

20. The modulator of claim 14, wherein an "I" denotes the in-phase axis and a "Q" denotes the quadrature axis.

21. The modulator of claim 14, wherein n is a integer.

22. The modulator of claim 14, wherein n is a non-integer.

23. The modulator of claim 14, wherein the N symbol points further comprises:

an amplitude and a phase component for N/8 symbol points wherein the phase component of the symbol point, as identified by the location of the symbol point relative to the in-phase axis, is between 0° and 45°;

the amplitude and the phase component for the remaining (N−N/8) symbol points are such that, (Ij, Qj) represents a symbol point, j, with a phase component of $0° \leq \theta \leq 45°$ (Qj, Ij) represents a symbol point, j, with a phase component of $45° < \theta \leq 90°$ (−Qj, Ij) represents a symbol point, j, with a phase component of $90° < \theta \leq 135°$ (−Ij, Qj) represents a symbol point, j, with a phase component of $135° < \theta \leq 180°$ (−Ij, −Qj) represents a symbol point, j, with a phase component of $180° < \theta \leq 225°$ (−Qj, −Ij) represents a symbol point, j, with a phase component of $225° < \theta \leq 270°$ (Qj, −Ij) represents a symbol point, j, with a phase component of $270° < \theta \leq 315°$ (Ij, −Qj) represents a symbol point, j, with a phase component of $315° < \theta < 360°$.

24. A modulator for mapping a binary data stream of bits onto a modulation constellation, the modulator comprising:

a symmetric spherical quadrature amplitude modulation constellation in a multi-dimensional complex plane, the constellation comprising a plurality of symbol points, wherein the symbol points exhibit eighth fold symmetry with point group type 4 mm; and a mapper for mapping the symbol points to the symmetric spherical quadrature amplitude modulation constellation.

* * * * *